| (12) | United States Patent | (10) Patent No.: US 10,956,710 B2 |
|---|---|---|
| | Wada et al. | (45) Date of Patent: Mar. 23, 2021 |

(54) SUPPORT METHOD, SERVER, AND DESIGN SUPPORT SYSTEM

(71) Applicant: MISUMI CORPORATION, Tokyo (JP)

(72) Inventors: Takaaki Wada, Tokyo (JP); Mitsunobu Yoshida, Tokyo (JP); Kenji Nakagawa, Tokyo (JP); Atsushi Shibata, Tokyo (JP)

(73) Assignee: MISUMI CORPORATION, Tokyo (JP)

( * ) Notice: Subject to any disclaimer, the term of this patent is extended or adjusted under 35 U.S.C. 154(b) by 129 days.

(21) Appl. No.: 16/323,753

(22) PCT Filed: Jul. 14, 2017

(86) PCT No.: PCT/JP2017/025696
§ 371 (c)(1),
(2) Date: Feb. 6, 2019

(87) PCT Pub. No.: WO2018/030071
PCT Pub. Date: Feb. 15, 2018

(65) Prior Publication Data
US 2019/0171865 A1 Jun. 6, 2019

(30) Foreign Application Priority Data

Aug. 9, 2016 (JP) .............................. JP2016-157025

(51) Int. Cl.
*G06K 9/00* (2006.01)
*G06F 30/00* (2020.01)
(Continued)

(52) U.S. Cl.
CPC ......... *G06K 9/00201* (2013.01); *G06F 30/00* (2020.01); *G06T 19/20* (2013.01);
(Continued)

(58) Field of Classification Search
CPC . G06K 9/00201; G06F 30/00; G06F 2119/18; Y02P 90/30
See application file for complete search history.

(56) References Cited

U.S. PATENT DOCUMENTS 6,856,846 B2 * 2/2005 Fuki ........................ G06T 19/00
700/98
8,024,159 B2 * 9/2011 Sims, Jr. ................. G06F 30/00
703/1
(Continued)

FOREIGN PATENT DOCUMENTS

| JP | 200-172739 A | 6/2000 |
|---|---|---|
| JP | 2000-172739 A | 6/2000 |

(Continued)

OTHER PUBLICATIONS

Extended European Search Report dated Mar. 11, 2020 for the corresponding European Patent Application No. 17839144.7.
(Continued)

*Primary Examiner* — Santiago Garcia
(74) *Attorney, Agent, or Firm* — Leason Ellis LLP

(57) ABSTRACT

A design support system for permitting a design that easily meets desired conditions regarding an entire item group is provided. An automatic estimation system acting as the design support system comprises: an item recognition section that recognizes each of the items included in the item group by individually recognizing elements making up the
(Continued)

item; a designated condition recognition section that recognizes a designated condition from the manufacturing conditions; and a recommended-to-be-examined element recognition section that recognizes, with respect to the designated condition recognized, the element corresponding to any of the manufacturing conditions that is recommended to be examined for changes. The recommended-to-be-examined element recognition section displays a model of the item group by highlighting the element for which the manufacturing condition is recommended to be examined for changes.

5 Claims, 9 Drawing Sheets

(51) Int. Cl.
*G06T 19/20* (2011.01)
*G06F 119/18* (2020.01)

(52) U.S. Cl.
CPC .. *G06F 2119/18* (2020.01); *G06T 2219/2012* (2013.01); *Y02P 90/30* (2015.11)

(56) References Cited

U.S. PATENT DOCUMENTS

| | | | | |
|---|---|---|---|---|
| 2001/0055013 | A1* | 12/2001 | Fuki | G06F 30/17 345/419 |
| 2015/0127301 | A1* | 5/2015 | Seibold | G06F 30/00 703/1 |
| 2016/0063141 | A1* | 3/2016 | Rameau | G06F 30/00 703/1 |
| 2017/0116352 | A1* | 4/2017 | Kohlhoff | G06Q 10/06 |
| 2017/0220030 | A1* | 8/2017 | Grube | G06F 30/00 |
| 2017/0249410 | A1* | 8/2017 | Baker | G06F 30/00 |

FOREIGN PATENT DOCUMENTS

| | | |
|---|---|---|
| JP | 2009-093639 A | 4/2009 |
| JP | 2016-062403 A | 4/2016 |

OTHER PUBLICATIONS

Notification of Reasons for Refusal for Japanese Application No. 2016-157025, dated Apr. 27, 2018.
International Search Report dated Oct. 3, 2017 for the corresponding PCT International Patent Application No. PCT/JP2017/025696.

* cited by examiner

SUPPORT METHOD, SERVER, AND DESIGN SUPPORT SYSTEM

CROSS-REFERENCE TO RELATED PATENT APPLICATIONS

This application is a U.S. National Phase Application under 35 U.S.C. § 371 of International Patent Application No. PCT/JP2017/025696, filed Jul. 14, 2017, and claims the benefit of Japanese Patent Application No. 2016-157025, filed on Aug. 9, 2016, all of which are incorporated herein by reference in their entirety. The International Application was published in Japanese on Feb. 15, 2018 as International Publication No. WO/2018/030071 under PCT Article 21(2).

FIELD OF THE INVENTION

The present invention relates to a design support method, a server, and a design support system for supporting the design of an item group including a plurality of items.

BACKGROUND OF THE INVENTION

Heretofore, there have been design support systems that provide a three-dimensional (3D) display of shape data (e.g., computer-aided design (CAD) data) regarding mechanical equipment typically including a plurality of sheet-metal parts, machined parts, pressed parts, and injection-molded parts (called "items" hereunder, hence the mechanical equipment is referred to as "item group" hereunder) with a view to supporting the design of the assembly of the items.

One such design support system is known to display, in the same color, the items having the same manufacturing conditions such as the same tolerance, material, and surface treatment (e.g., see Japanese Unexamined Publication No. 2009-93639).

Technical Problem

However, the existing design support systems such as one described in Japanese Unexamined Publication No. 2009-93639 involve recognizing a plurality of items having the same manufacturing conditions as a single group and allowing the plurality of items in the group to be selected collectively to improve the operational convenience at design time.

For that reason, if a user has no specialized knowledge of design or if a manufacturing condition of one item or one group is changed, there is the possibility of having to examine, one by one, the items in the group or items not in that group or in some other group concerned with the changed condition as to whether their manufacturing conditions need to be changed.

The present invention has been made in view of the above circumstances. An object of the invention is therefore to provide a design support method, a server, and a design support system capable of performing design that easily meets the desired conditions for the entire item group.

SUMMARY OF THE INVENTION

Solution to Problem

In achieving the above object and according to the present invention, there is provided a design support method for supporting the design of an item group including a plurality of items, the design support method comprising:

an item recognizing step of recognizing each of the items included in the item group by individually recognizing elements making up the item;

a manufacturing condition acquiring step of acquiring, for each of the recognized items, manufacturing conditions selectable at a time of manufacturing the item;

a designated condition recognizing step of recognizing a designated condition from the manufacturing conditions;

a recommended-to-be-examined element recognizing step of recognizing, with respect to the designated condition recognized, the element corresponding to any of the manufacturing conditions that is recommended to be examined for changes; and an item group displaying step of displaying a model of the item group by highlighting the element for which the manufacturing condition is recommended to be examined for changes.

As outlined above, the design support method of the present invention involves first determining the manufacturing conditions recommended to be examined for changes with respect to the condition designated regarding the elements making up any of the items. Thereafter, the elements corresponding to the manufacturing conditions recommended to be examined for changes are highlighted on a display that indicates a model of the item group.

At this point, the criteria for discriminating whether a given manufacturing condition is recommended to be examined for changes may be constituted by desired conditions determined beforehand by a user regarding the item group as a whole (e.g., price, delivery date, weight, size, etc., of the entire item group), or by previously accumulated data about the conditions preferred in terms of design or about the conditions generally favored by users.

This allows the user to visually recognize, as specific elements, the manufacturing condition to be examined next. That is, the design support method of the present invention permits presentation of the manufacturing conditions to be examined in an intuitively comprehensible manner, so that the manufacturing conditions are examined efficiently.

Thus, the design support method of the present invention allows the user, who may not possess specialized knowledge of design, to easily design the entire item group that meets the desired conditions.

With the design support method of the present invention, if there are a plurality of the elements highlighted on display by the above-mentioned item group displaying step, the highlighted elements for which the same manufacturing condition is designated are preferably painted in the same color.

The above configuration makes it possible to examine a plurality of elements at the same time. As a result, the entire item group can be designed more easily in a manner meeting the desired conditions.

Also, in achieving the above object and according to the present invention, there is provided a server for supporting an item group including a plurality of items, the server comprising:

an item recognition section recognizing each of the items included in the item group by individually recognizing elements making up the item;

an item information storage section storing a manufacturing condition for each of the elements selectable at a time of manufacturing the items;

a manufacturing condition acquisition section acquiring, for each of the items recognized by the item recognition section, the manufacturing conditions selectable at a time of manufacturing the item;

a designated condition recognition section recognizing a designated condition from the manufacturing conditions;

a recommended-to-be-examined element recognition section recognizing, with respect to the designated condition recognized, the element corresponding to any of the manufacturing conditions that is recommended to be examined for changes; and an item group display section displaying a model of the item group by highlighting the element for which the manufacturing condition is recommended to be examined for changes.

Also, in achieving the above object and according to the present invention, there is provided a design support system including the above-outlined server, an input terminal, and an output terminal.

DETAILED DESCRIPTION OF THE INVENTION

A preferred embodiment of the present invention is described below with reference to the accompanying drawings. Explained first with reference to FIG. 1 is an automatic estimation system S embodying the present invention, the system being also used as a design support system.

Figure 1:
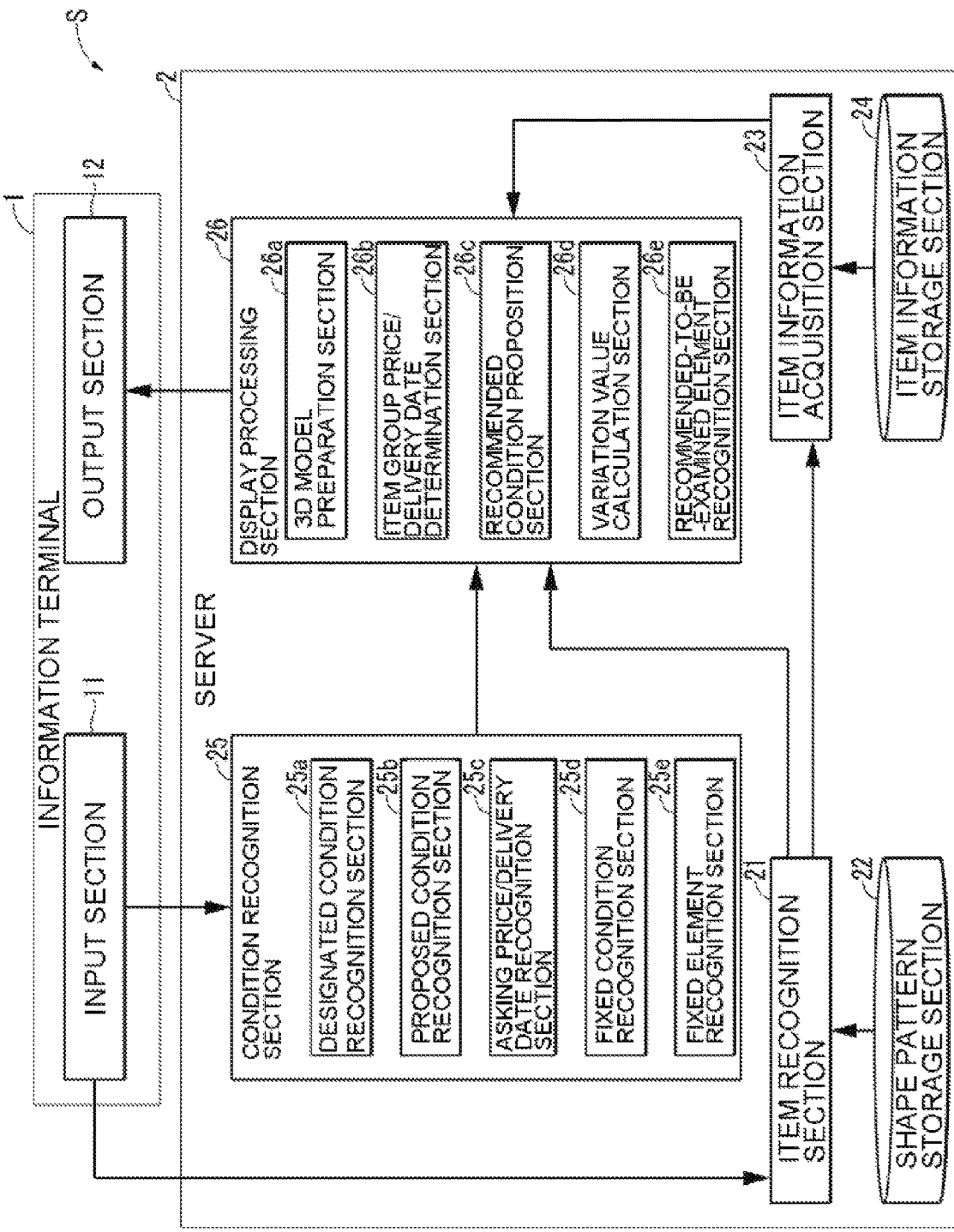
FIG. 1 is a block diagram showing a configuration of an automatic estimation system embodying the present invention.

As shown in FIG. 1, the automatic estimation system S (design support system) includes an information terminal 1 operated by a user and a server 2 connected with the information terminal 1 via lines such as the Internet. The automatic estimation system S determines a price and delivery date of mechanical equipment typically including a plurality of sheet-metal parts, machined parts, pressed parts, and injection-molded parts (called "items" hereunder, hence the mechanical equipment referred to as "item group" hereunder) by supporting the design of the mechanical equipment.

The design support method of the present invention is applicable not just to the system including a server and a plurality of information terminals (input and output terminals) connected with the server via a network. For example, the design support method may also be applied to a single information terminal that includes an input section 11 and an output section 12 in an information terminal 1, to be discussed later, and processing and storage sections in a server 2.

The information terminal 1 has the input section 11 that includes input devices such as a keyboard, a mouse, and a touch panel, and the output section 12 including such output devices as a liquid crystal display and speakers. The information input by the user to the information terminal 1 via the input section 11 is transmitted to the server 2 by way of the network. The result of the processing performed by the server 2 on the basis of the transmitted information is transmitted to the information terminal 1 and displayed on the output section 12 for presentation to the user.

The server 2 is a computer including a central processing unit (CPU) and a memory, among others. The server 2 includes an item recognition section 21, a shape pattern storage section 22, an item information acquisition section 23 (manufacturing condition acquisition section), an item information storage section 24, a condition recognition section 25, and a display processing section 26 (item group display section).

The item recognition section 21 recognizes, in constituent elements, each of the items included in a given item group on the basis of the shape data (e.g., CAD data) regarding the item group, the data being input via the input section 11 in the information terminal 1.

The shape pattern storage section 22 stores the shape patterns of diverse items. The shape patterns are referenced by the item recognition section 21 at a time of recognizing the types of the items in the item group and the elements constituting the items.

From the item information storage section 24, the item information acquisition section 23 acquires, for each item recognized by the item recognition section 21, the manufacturing conditions that can be selected at a time of manufacturing the item and the price and delivery date of the item in the case where any of the manufacturing conditions is selected.

The manufacturing conditions here may include, for example, dimensions, tolerance, material, hardness, and surface treatment in addition to diverse parameters that may affect the results of estimation of the item such as its price and delivery date or the nature of the item group involved (its size and weight).

The item information storage section 24 stores, for each item in an item group that can be ordered and designed via the automatic estimation system S, the manufacturing conditions that can be selected at a time of manufacturing the item and the price and delivery date of the item in the case where any of the manufacturing conditions is selected. The stored manufacturing conditions are set and stored not in terms of items but rather in constituent elements of the items.

The condition recognition section 25 recognizes the information input by the user via the input section 11 in the information terminal 1. The condition recognition section 25 includes a designated condition recognition section 25a, a proposed condition recognition section 25b, an asking price/delivery date recognition section 25c, a fixed condition recognition section 25d, and a fixed element recognition section 25e.

The designated condition recognition section 25a recognizes, from the manufacturing conditions displayed selectably on the output section 12 in the information terminal 1, the condition designated through selection by the user via the input section 11 in the information terminal 1.

The proposed condition recognition section 25b recognizes, from the proposed requests displayed selectably on the output section 12 in the information terminal 1, the types of those requests selected by the user via the input section 11 in the information terminal 1.

The asking price/delivery date recognition section 25c recognizes the asking price and delivery date of the item group input to input fields displayed on the output section 12 by the user via the input section 11 in the information terminal 1.

The fixed condition recognition section 25d recognizes, from the manufacturing conditions displayed selectably on the output section 12 in the information terminal 1, the designated condition selected by the user via the input section 11 in the information terminal 1.

The fixed element recognition section 25e recognizes fixed items and fixed elements selected by the user via the input section 11 in the information terminal 1 from the items and the constituent elements making up each item in a 3D model of the item group displayed on the output section 12 in the information terminal 1.

As described above, the automatic estimation system S complies with a format in which selections are made from the designated condition, type of the proposed request, fixed conditions, fixed items, and fixed elements being presented. However, the format in which to select the designated condition, type of the proposed request, fixed conditions, fixed items, or fixed elements is not limited to the above format for designation. Alternatively, the condition, request type, items, and elements may be designated in a format for direct character string input or for direct voice input.

Also, the automatic estimation system S complies with a format in which the asking price and delivery date are directly input for designation. However, the format in which to designate the asking price and delivery date is not limited to the above format for direct input. Alternatively, there may be provided a format in which the asking price and delivery date are selected from among those presented.

The display processing section 26 displays, on the output section 12 in the information terminal 1, basic information, a 3D model, manufacturing conditions, and results of estimation regarding the item group on the basis of the information from the item recognition section 21, item information acquisition section 23, and condition recognition section 25. The display processing section 26 includes a 3D model preparation section 26a, an item group price/delivery date determination section 26b, a recommended condition proposition section 26c, a variation value calculation section 26d, and a recommended-to-be-examined element recognition section 26e.

The 3D model preparation section 26a prepares a 3D model based on the shapes of items recognized by the item recognition section 21, and causes the output section 12 in the information terminal 1 to display the prepared 3D model. The 3D model prepared by the 3D model preparation section 26a is segmented into the items and the elements making up each item, the items and elements being painted each in a color as desired. The 3D model may also be selected in units of elements.

The item group price/delivery date determination section 26b determines the price and delivery date (estimation result) of the item group on the basis of the item prices and delivery dates corresponding to the designated conditions recognized by the designated condition recognition section 25a. The item group price/delivery date determination section 26b causes the output section 12 in the information terminal 1 to display the determined price and delivery date of the item group.

The recommended condition proposition section 26c selects the recommended condition from the manufacturing conditions in accordance with the requested type of the proposed request, and displays the recommended condition thus selected on the output section 12 in the information terminal 1.

The variation value calculation section 26d calculates the variation values of the determined (i.e., current) price and delivery date regarding any of the manufacturing conditions that may have been changed. The variation value calculation section 26d displays the calculated variation values on the output section 12 in the information terminal 1.

When the designated condition is selected, the recommended-to-be-examined element recognition section 26e recognizes the elements for which the manufacturing conditions are recommended to be examined for changes, and displays the recognized elements on the output section 12 in the information terminal 1.

As described above, varieties of information resulting from the processing by the item group price/delivery date determination section 26b, recommended condition proposition section 26c, variation value calculation section 26d, and recommended-to-be-examined element recognition section 26e in the automatic estimation system S are output as images on the display screen of the output section 12 in the information terminal 1. Alternatively, these pieces of information may be output as both images and sounds.

Figure 2:
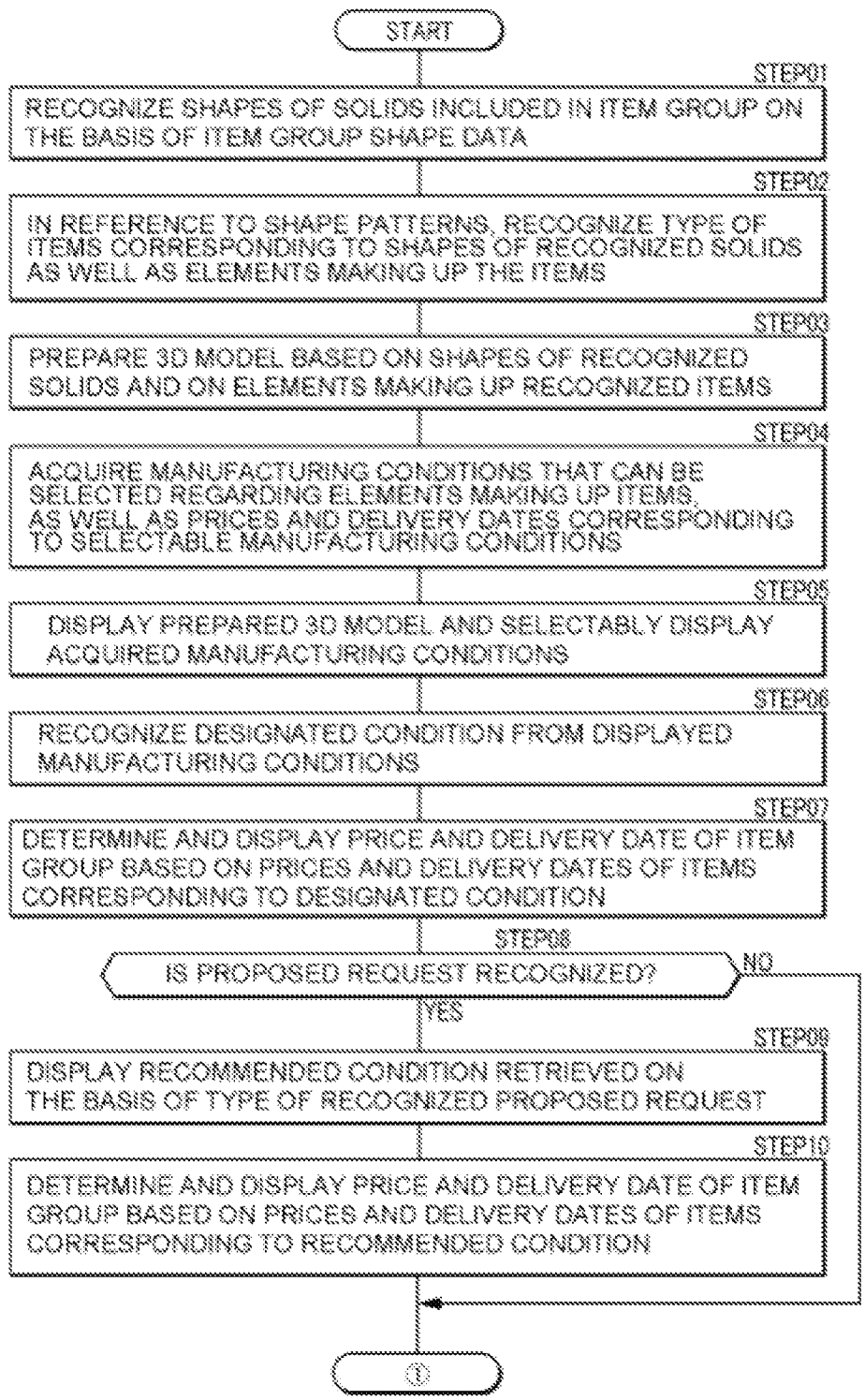
FIG. 2 is a flowchart showing a process performed by a server of the automatic estimation system in FIG. 1, the process ranging from an item recognizing step to a recommended condition proposing step.
Figure 3:
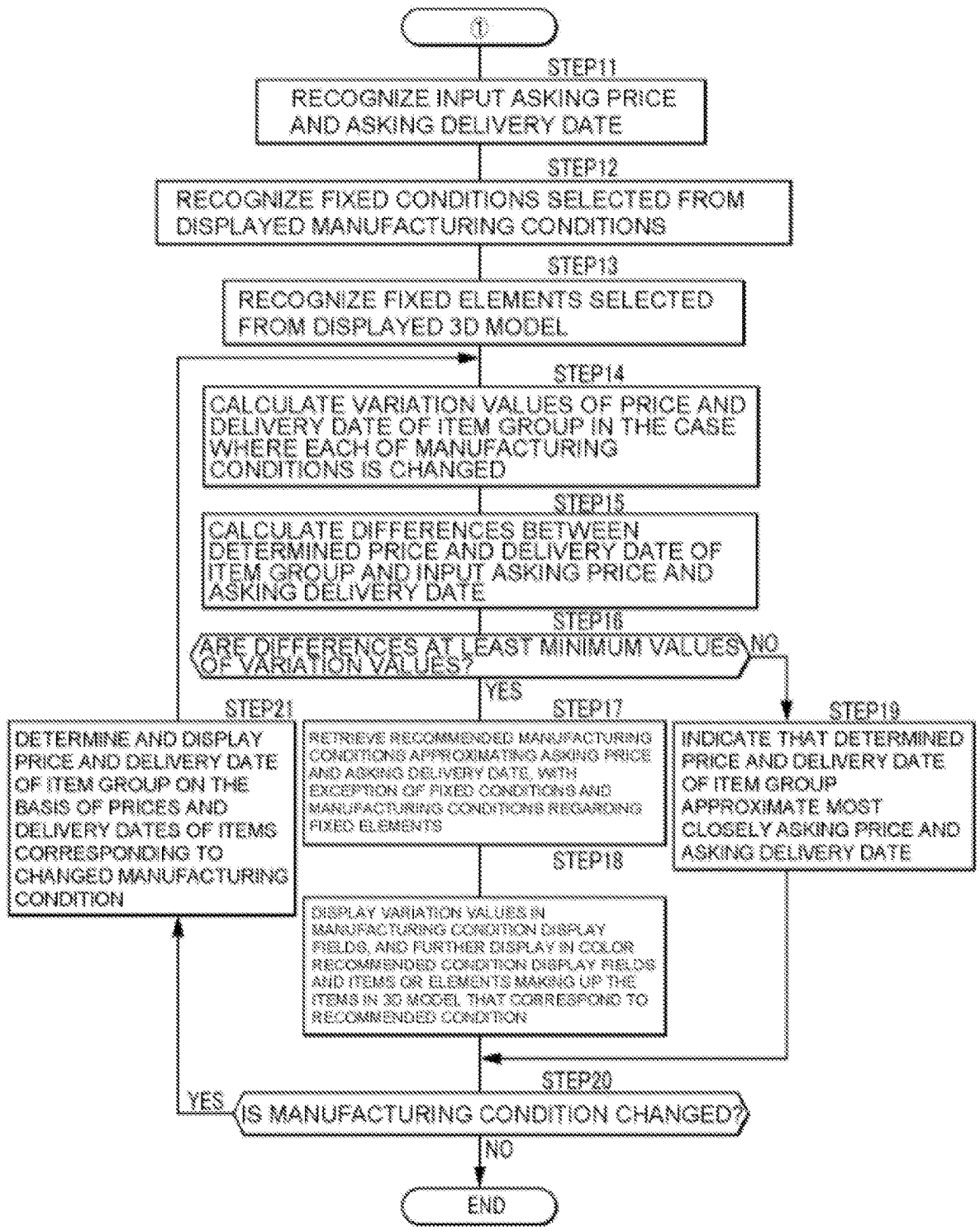
FIG. 3 is a flowchart showing a process performed by the server of the automatic estimation system in FIG. 1, the process ranging from an asking price/delivery date recognizing step to an item group displaying step.

The processes performed by the server 2 of the automatic estimation system S are explained below with reference to FIGS. 1 to 9. FIGS. 2 and 3 are flowcharts of the processes carried out by the server 2 of the automatic estimation system S.

First, the item recognition section 21 recognizes the shapes of the constituent elements (hereinafter, referred to as "solids") of the item group based on the shape data regarding the item group input by the user to the input section 11 in the information terminal 1 (STEP 01 in FIG. 2).

Figure 4:
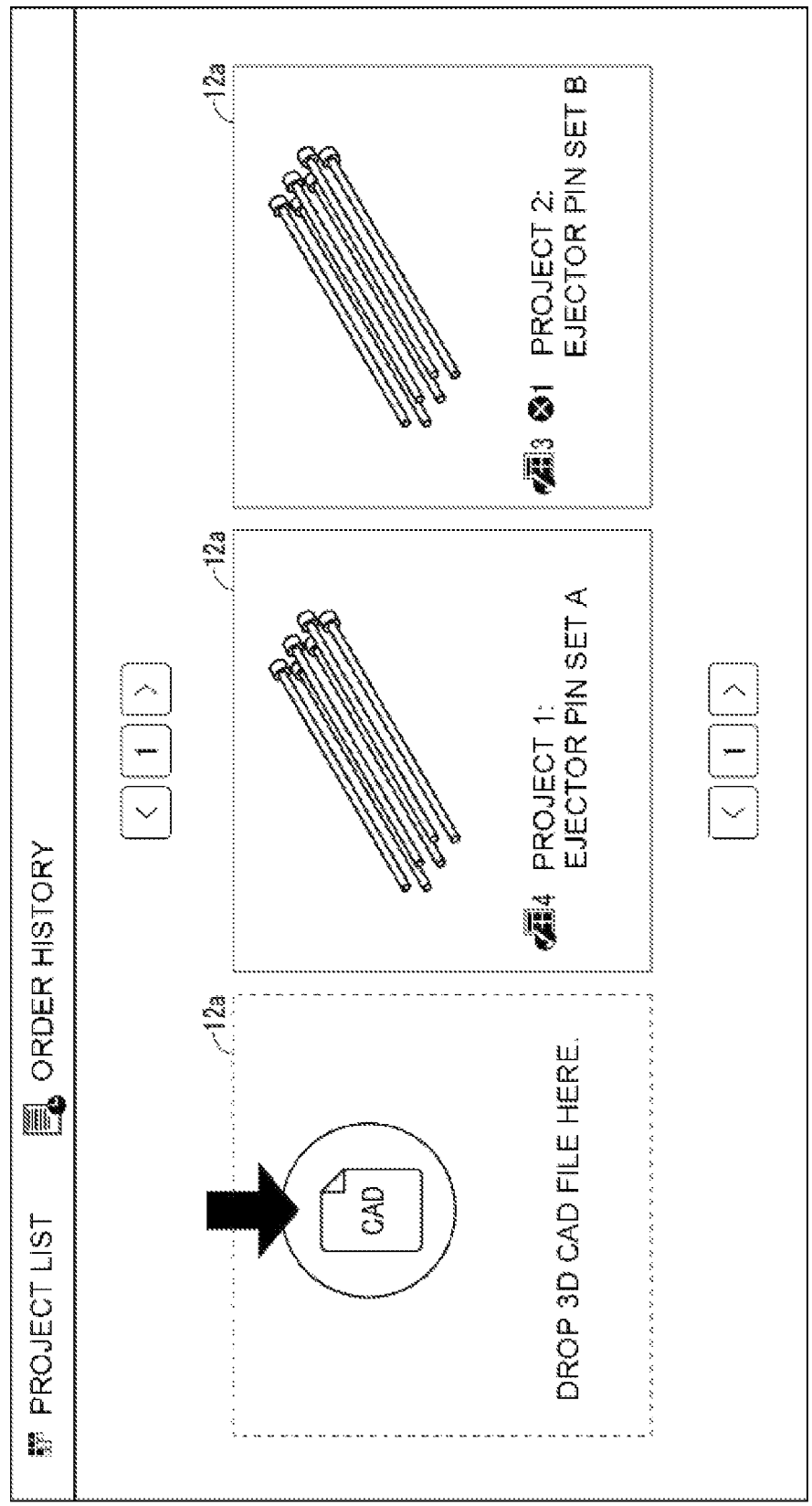
FIG. 4 is a schematic diagram showing a typical image displayed on a display screen in STEP 01 in FIG. 2.

In STEP 01, the image such as one in FIG. 4 is displayed on the display screen of the output section 12 in the information terminal 1. The user inputs the shape data to a shape data input area 12a on the display screen. Alternatively, the user selects previously input shape data displayed in the shape data input area 12a (e.g., data indicated either as "PROJECT 1: EJECTOR PIN SET A," or as "PROJECT 2: EJECTOR PIN SET B" in FIG. 4). This allows the item recognition section 21 to recognize the item group shape data.

Incidentally, the automatic estimation system of this embodiment uses 3D CAD data as the item group shape data. However, the shape data is not limited to the 3D CAD data. Alternatively, the shape data may be a plurality of two-dimensional (2D) CAD data or data in some other suitable format permitting recognition of the shapes of the solids included in the item group.

The item recognition section 21 then references the shape patterns stored in the shape pattern storage section 22 in order to recognize the type of the items corresponding to the shapes of the recognized solids as well as the elements making up the items (STEP 02 in FIG. 2).

STEP 01 and STEP 02 above constitute the item recognizing step in the process performed by the automatic estimation system S.

Next, the item recognition section 21 prepares a 3D model of the item group based on the shapes of the solids recognized by the item recognition section 21 and on the elements making up the recognized items (STEP 03 in FIG. 2).

The 3D model of the item group prepared at this point is segmented into the items and the elements making up each item, the segments being painted each in a color as desired. Each of the elements of the 3D model is selectable. The item group may be modeled not only as a 3D model but also as a 2D model. The colors used to paint the segments include a colorless portion.

The item information acquisition section 23 then acquires, from the item information storage section 24, the manufacturing conditions that can be selected regarding the elements making up the items recognized by the item recognition section 21, as well as the prices and delivery dates corresponding to the selectable manufacturing conditions (STEP 04 in FIG. 2).

STEP 04 above is the manufacturing condition acquiring step in the process performed by the automatic estimation system S.

The display processing section 26 then displays the prepared 3D model and also displays the acquired manufacturing conditions in a selectable manner (STEP 05 in FIG. 2).

Figure 5:
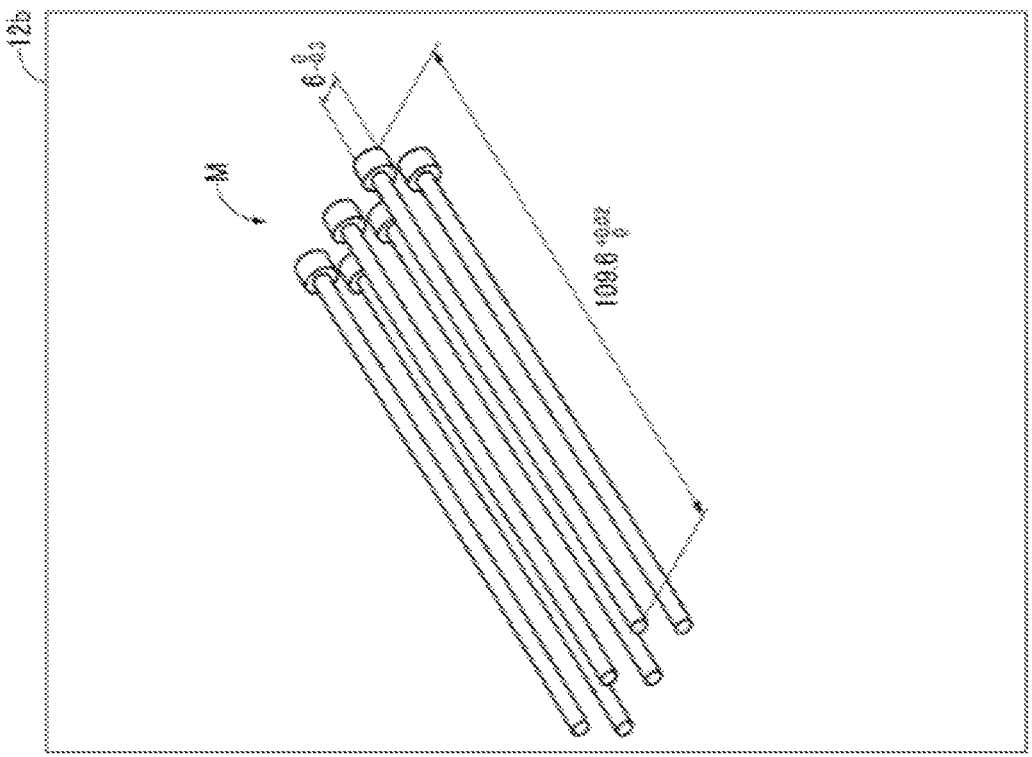
FIG. 5 is a schematic diagram showing a typical image displayed on the display screen in STEP 05 in FIG. 2.

In STEP 05, the image such as one in FIG. 5 is displayed on the display screen of the output section 12 in the information terminal 1. Specifically, what is displayed is an image that includes a model display area 12b, a basic information display area 12c, a manufacturing condition display area 12d, an asking price/delivery date input area 12e, a proposed request display area 12f, and an estimation result display area 12g.

The model display area 12b displays a 3D model M of the item group constituted by a plurality of items in a manner allowing each of the elements making up the items to be selected. The display of this 3D model M can be rotatably changed by the user operating the input section 11. Also, the format in which the 3D model M is displayed may be changed as desired (i.e., in terms of positions of dimension indications and wire frame indications).

The basic information display area 12c displays basic information regarding the item group. The basic information includes, for example, the project name, the type of items (item name), and the number of items (quantity). In this embodiment, the item group is an ejector pin set consisting of only 6 ejector pins, so that the item name is given solely as the ejector pin, with the noted quantity covering only the ejector pins.

The manufacturing condition display area 12d displays the manufacturing conditions such as material and hardness in a selectable format. Specifically, the selectable manufacturing conditions are displayed as a pull-down menu in a manufacturing condition selection area 12d1. In addition to the manufacturing condition selection area 12d1, the manufacturing condition display area 12d displays fixed checkboxes 12d2 and a variation value display area 12d3, to be discussed later.

The asking price/delivery date input area 12e displays input fields for the asking price and the asking delivery date. The user may input desired values into these input fields via the input section 11 in the information terminal 1.

The proposed request display area 12f displays proposed request buttons to be used when a proposed request is made, as will be discussed later. In this embodiment, two buttons are displayed: a "LOWEST PRICE" button and an "EARLIEST DELIVERY DATE" button.

The estimation result display area 12g displays the price and delivery date (shipping date) of the item group as the result of estimation. This area is currently blank because estimates have yet to be made at the time of STEP 05.

Then, the designated condition recognition section 25a in the condition recognition section 25 recognizes the designated condition selected by the user from the displayed manufacturing conditions via the input section 11 in the information terminal 1 (STEP 06 in FIG. 2).

STEP 06 above is the designated condition recognizing step in the process performed by the automatic estimation system S.

The item group price/delivery date determination section 26b in the display processing section 26 then determines the delivery date and price of the item group based on the designated condition recognized by the designated condition recognition section 25a in the condition recognition section 25 and on the item-by-item prices and delivery dates acquired by the item information acquisition section 23. The item group price/delivery date determination section 26b causes the output section 12 in the information terminal 1 to display the determined delivery date and price (STEP 07 in FIG. 2).

Specifically, the price of the item group may be determined, for example, by totaling the prices of a plurality of the items making up the item group, the totaled price being optionally supplemented with an assembly cost. The delivery date of the item group may be determined by selecting the latest of the delivery dates of a plurality of the items making up the item group. The delivery date of the item group may also be determined by supplementing the latest delivery date with the work time for assembly.

Figure 6:
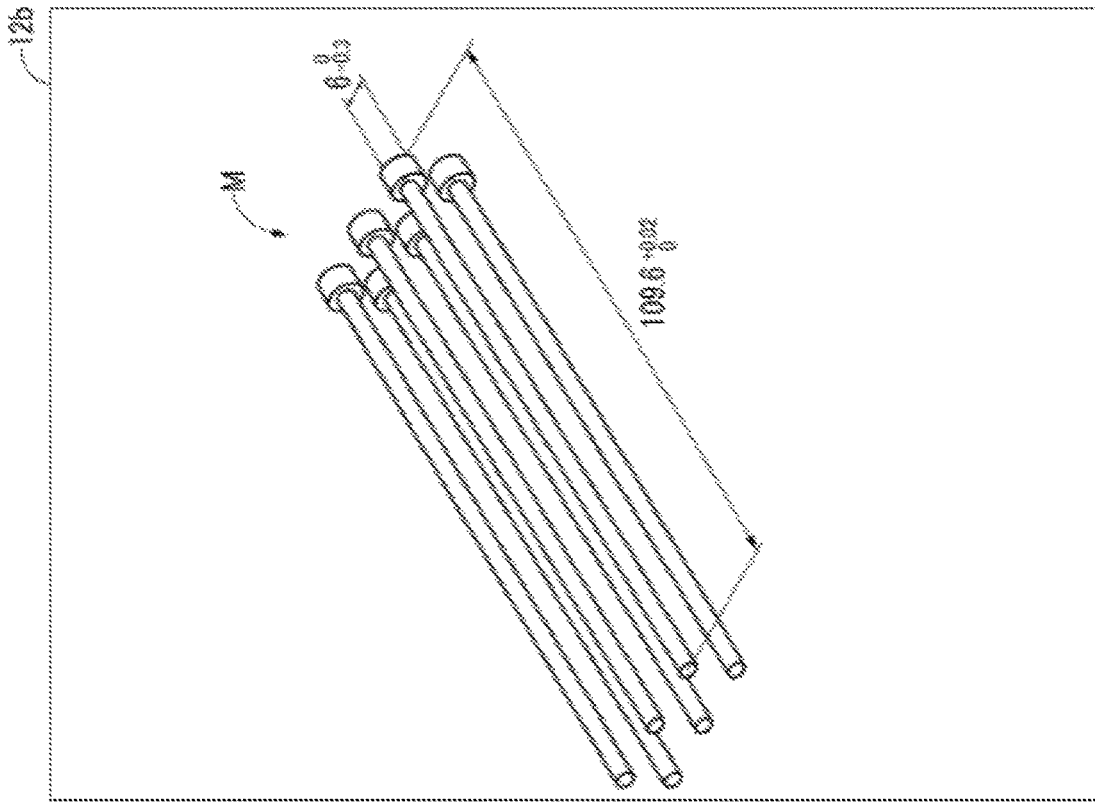
FIG. 6 is a schematic diagram showing a typical image displayed on the display screen in STEP 07 in FIG. 2.

Thereafter, as in the image in FIG. 6, for example, the display screen of the output section 12 in the information terminal 1 displays, in the estimation result display area 12g, the price and delivery date of the item group determined by the item group price/delivery date determination section 26b.

Alternatively, STEP 07 may be omitted, i.e., the results of the estimation may not be displayed at this stage. Specifically, control may be transferred, without the image in FIG. 6 being displayed, to the next step with the image in FIG. 5 being displayed.

STEP 07 above, together with STEP 21 to be discussed later, constitutes the item group price/delivery date determining step in the process performed by the automatic estimation system S.

Then, the proposed condition recognition section 25b in the condition recognition section 25 discriminates whether the proposed request is recognized (STEP 08 in FIG. 2).

Specifically, the proposed condition recognition section 25b discriminates whether the "LOWEST PRICE" button or the "EARLIEST DELIVERY DATE" button is selected in the proposed request display area 12f on the display screen of the output section 12 in the information terminal 1.

In the case where the proposed request is recognized (when "YES" is selected in STEP 08), the recommended condition proposition section 26c retrieves the recommend condition from the manufacturing conditions acquired by the item information acquisition section 23 in accordance with the type of the proposed request recognized by the proposed condition recognition section 25b. The recommended condition proposition section 26c further displays the retrieved recommended condition on the output section 12 in the information terminal 1 (STEP 09 in FIG. 2).

Specifically, the recommended condition proposition section 26c first acquires a plurality of manufacturing conditions in which the prices are low and the delivery dates are early. The recommended condition proposition section 26c then retrieves the manufacturing condition in which the price of the item group as a whole is the lowest at a time of manufacture or at which the delivery date of the entire item group is the earliest, and recognizes the result of the retrieval as the recommended condition. At this point, if the manufacturing conditions to be fixed have been designated by processes similar to STEP 12 and STEP 13, to be discussed later, or if the items or the elements constituting any item for which the manufacturing conditions need to be fixed have been designated, these manufacturing conditions, items, or constituent elements are excluded from the retrieval.

The item group price/delivery date determination section 26b in the display processing section 26 then determines the delivery date and price of the item group based on the recommended condition retrieved by the recommended condition proposition section 26c and on the prices and delivery dates of the individual items acquired by the item information acquisition section 23. The item group price/delivery date determination section 26b displays the determined delivery date and price of the item group on the output section 12 in the information terminal 1 (STEP 10 in FIG. 2).

Figure 7:
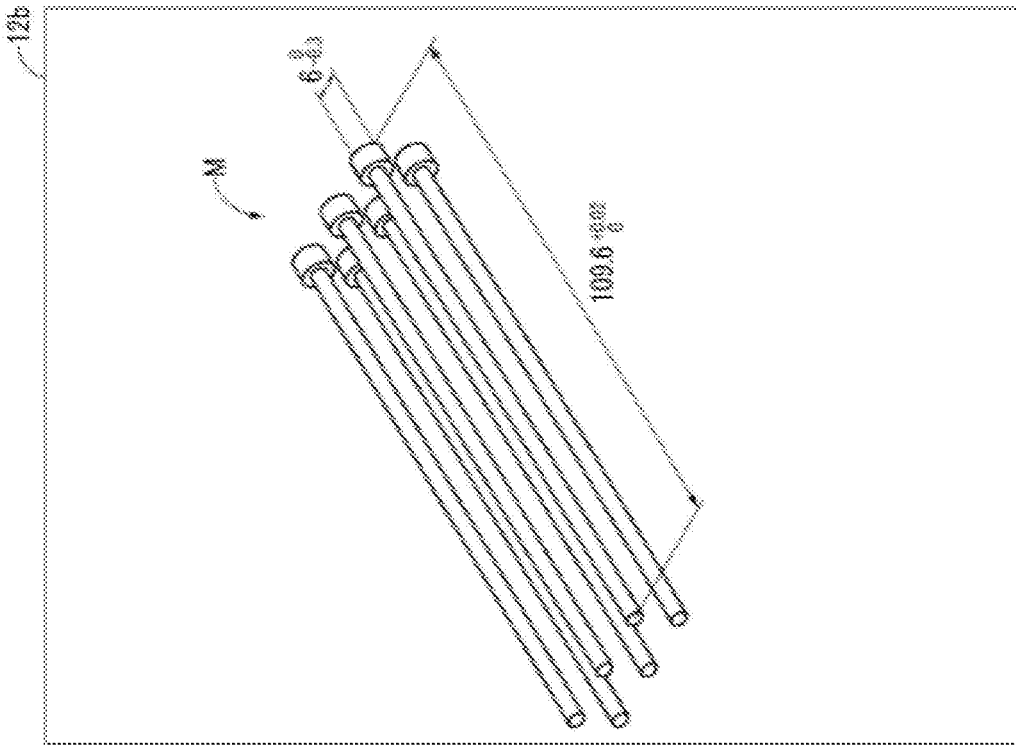
FIG. 7 is a schematic diagram showing a typical image displayed on the display screen in STEP 09 and STEP 10 in FIG. 2.

In STEP 09 and STEP 10, the image such as one in FIG. 7 is displayed on the display screen of the output section 12 in the information terminal 1. This display screen displays the values selected in the manufacturing condition selection area 12d1 of the manufacturing condition display area 12d and the values displayed in the estimation result display area 12g, the values being changed from those in FIG. 6 (i.e., different from the values at the time of STEP 07).

Specifically, if the "LOWEST PRICE" button is selected, "SHIPPING DATE" (delivery date) is changed from "Jun. 29, 2016" to "Jul. 4, 2016" and the total price is changed from "4,910 yen" to the lowest price "3,890 yen" concomitant with "MATERIAL" in the manufacturing condition selection area 12d1 being changed from "SKH51 (58-60 HRC)" to the recommended "NAK80 (37-43 HRC)" and with "HARDNESS" being changed from "58-60 HRC" to the recommended "37-43 HRC."

STEP 08 through STEP 10 above constitute the recommended condition proposing step in the process performed by the automatic estimation system S.

As described above, the automatic estimation system S proposes the recommended condition (base settings regarding the manufacturing conditions) based on the proposed request. This allows the user to perform design while referencing the base design.

After the delivery date and price of the item group based on the recommended condition have been displayed (after STEP 10) or in the case where the proposed request is not recognized ("NO" in STEP 08), the asking price/delivery date recognition section 25c in the condition recognition section 25 recognizes the asking price and delivery date input by the user via the input section 11 in the information terminal 1 (STEP 11 in FIG. 3).

Specifically, the asking price/delivery date recognition section 25c recognizes the values input by the user via the input section 11 of the information terminal 1 into the input fields of the asking price/delivery date input area 12e displayed on the display screen of the output section 12.

STEP 11 above is the asking price/delivery date recognizing step in the process performed by the automatic estimation system S.

Then, the fixed condition recognition section 25d in the condition recognition section 25 recognizes the fixed conditions selected from the displayed manufacturing conditions by the user via the input section 11 in the information terminal 1 (STEP 12 in FIG. 3).

Specifically, the fixed condition recognition section 25d recognizes the manufacturing conditions of which the fixed checkboxes 12d2 are checked in the image displayed on the display screen of the output section 12.

The fixed element recognition section 25e then recognizes the fixed items or fixed elements (hereinafter, generically referred to as "fixed elements") selected from the displayed 3D model by the user via the input section 11 in the information terminal 1 (STEP 13 in FIG. 3).

Specifically, the fixed element recognition section 25e recognizes the items or the item constituent elements which have the manufacturing conditions fixed and which are directly selected from the 3D model M displayed on the display screen of the output section 12.

STEP 12 above is the fixed condition recognizing step in the process performed by the automatic estimation system S. STEP 13 above is the fixed element recognizing step in the process carried out by the automatic estimation system S.

As described above, the automatic estimation system S permits selection of the manufacturing condition desired by the user or selection of the items or the elements whose manufacturing conditions are to be fixed (i.e., selection of the fixed conditions or the fixed elements). This makes it possible to further narrow down the manufacturing conditions to be examined for changes.

Alternatively, STEP 12 and STEP 13 above may be omitted. Control may then be transferred to the next step without the fixed conditions or the fixed elements being selected.

On the basis of the price and delivery date regarding each of the manufacturing conditions acquired by the item information acquisition section 23, the variation value calculation section 26d in the display processing section 26 then calculates the variation values of the price and delivery date of the item group in the case where each of its manufacturing conditions is changed (STEP 14 in FIG. 3).

Specifically, in reference to the price and delivery date of the item group determined (i.e., currently) by the item group price/delivery date determination section 26b, the variation value calculation section 26d calculates the variation values of the price and delivery date of the item group determined in the case where the manufacturing condition involved is changed.

STEP 14 above is the variation value calculating step in the process performed by the automatic estimation system S.

The recommended-to-be-examined element recognition section 26e in the display processing section 26 then calculates the differences between the determined (i.e., current) price and delivery date of the item group on the one hand and the input asking price and asking delivery date on the other hand (STEP 15 in FIG. 3).

The recommended-to-be-examined element recognition section 26e then discriminates whether the differences are at least minimum values of the variation values (STEP 16 in FIG. 3).

In the case where the differences are at least the minimum values of the variation values ("YES" in STEP 16), the recommended-to-be-examined element recognition section 26e retrieves the recommended manufacturing conditions which, if changed, approximate the asking price and asking delivery date, with the exception of the fixed conditions and the manufacturing conditions regarding the fixed elements (STEP 17 in FIG. 3).

Specifically, the recommended-to-be-examined element recognition section 26*e* retrieves the manufacturing conditions whose variation values approximate the differences. At this point, the recommended-to-be-examined element recognition section 26*e* may retrieve a plurality of manufacturing conditions which, if changed, approximate the asking price and asking delivery date. For each of the retrieved manufacturing conditions, the recommended-to-be-examined element recognition section 26*e* may also recognize the degree of how closely the item group price and delivery date determined following the change of the condition approximate the asking price and the asking delivery date. Specifically, the manufacturing conditions whose variation values approximate the differences may be recognized as having high degrees of approximation.

STEP 17 above is the recommended-to-be-examined element recognizing step in the process performed by the automatic estimation system S.

The recommended-to-be-examined element recognition section 26*e* then displays the variation values in manufacturing condition display fields, and further displays in color those manufacturing condition display fields corresponding to the recommended condition as well as the items or the elements constituting the items in the 3D model that correspond to the recommended condition (STEP 18 in FIG. 3).

Figure 8:
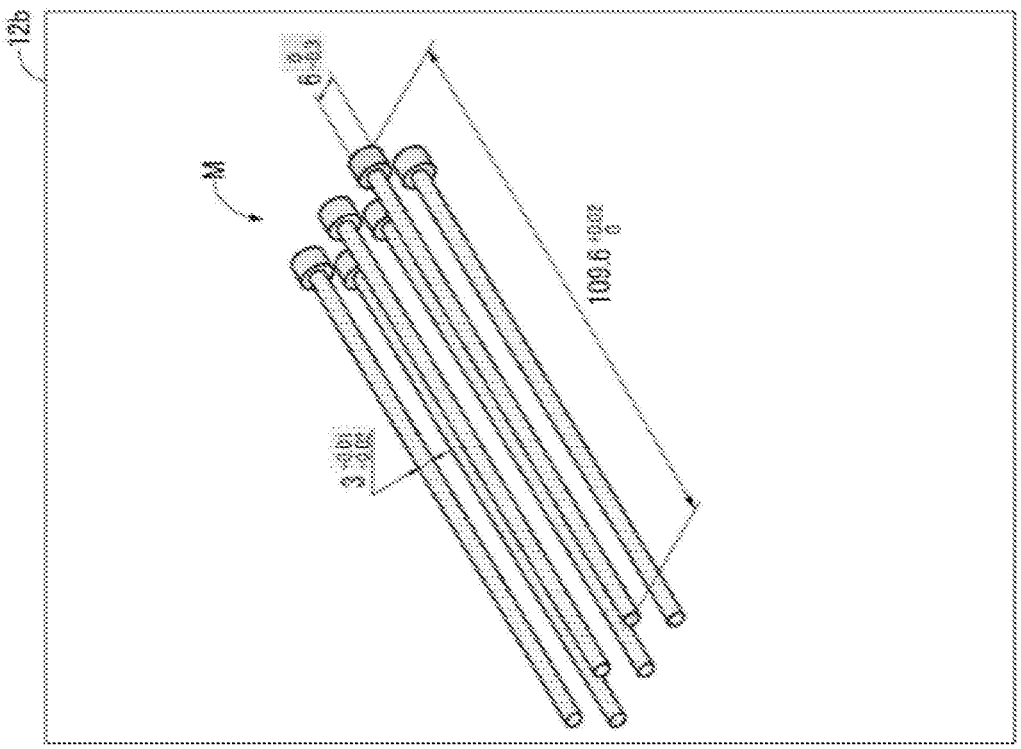
FIG. 8 is a schematic diagram showing a typical image displayed on the display screen in STEP 18 in FIG. 3.

For example, as in the image in FIG. 8, the variation values are displayed in the variation value display area 12*d*3 inside the manufacturing condition display area 12*d* on the display screen of the output section 12 in the information terminal 1. At the same time, of the manufacturing conditions in the manufacturing condition selection area 12*d*1, those corresponding to the recommended condition are displayed in color. Also, of the items in the 3D model M displayed in the model display area 12*b*, those corresponding to the recommended condition are displayed in color.

Specifically, the variation value display area 12*d*3 displays the variation value for each of the options included in the pull-down menu of "FLANGE DIAMETER TOLERANCE" (i.e., "+235 YEN" displayed in the option "0/−0.02"). Incidentally, with this embodiment, the variation value of the delivery date is not displayed.

Alternatively, the variation value of the delivery date may be displayed in place of the variation value of the price. As another alternative, both the variation value of the price and that of the delivery date may be displayed.

Also, given the displayed options, the manufacturing condition display area 12*d* highlights, in different colors, "FLANGE DIAMETER TOLERANCE" for which the manufacturing condition is changed and "SHANK DIAMETER TOLERANCE" for which the manufacturing condition is recommended to be examined for changes.

Also, the model display area 12*b* highlights the element corresponding to "FLANGE" as the item selected from the 3D model M as well as the tolerance value of the element size using a color similar to that of "FLANGE DIAMETER TOLERANCE," the name displayed in the manufacturing condition display area 12*d*. At the same time, the model display area 12*b* highlights "FLANGE" of the other items for which the manufacturing conditions are similar to those of "FLANGE" as the currently selected item using a color similar to but lighter than that of "FLANGE," the current item.

Furthermore, the model display area 12*b* highlights the element corresponding to "SHANK DIAMETER TOLERANCE" associated with the recommended condition and the tolerance value of the element size, using a color similar to that of "SHANK DIAMETER TOLERANCE," the name displayed in the manufacturing condition display area 12*d*.

STEP 18 above is the item group displaying step in the process performed by the automatic estimation system S.

As described above, the automatic estimation system S indicates the manufacturing condition to be examined to let the price and delivery date of the item group approximate respectively the asking price and asking delivery date, the manufacturing condition being color-highlighted as the recommended condition. This allows the user to visually recognize the manufacturing condition to be examined next for specific elements. That is, the automatic estimation system S presents the manufacturing condition to be examined in an intuitively comprehensible manner so that the user can efficiently examine the manufacturing condition.

In the case where a plurality of recommended conditions are retrieved in STEP 17 above, those elements which correspond to the recommended condition and for which the same manufacturing condition is designated (e.g., individual flanges of a plurality of the pins in this embodiment) may be highlighted in the same color when the recommended condition is presented in STEP 18, as shown in FIG. 8.

Where a plurality of elements corresponding to the recommended condition are arranged to be highlighted on display as described above, a plurality of elements (manufacturing conditions) can be examined at the same time. Specifically, it is possible to examine whether to collectively change the manufacturing conditions or whether to change only part of the manufacturing conditions.

In STEP 17 above, in the case where a plurality of recommended conditions are retrieved and where calculations are made of how closely the item group price and delivery date determined after changing of the manufacturing conditions approximate the asking price and asking delivery date respectively (i.e., calculation of the degrees of approximation), each of the elements corresponding to the recommended condition may be highlighted in a different color reflecting the degree of approximation (e.g., the higher the degree of approximation, the darker the color in which the recommended condition is painted) when the recommended condition is presented in STEP 18.

When a plurality of types of recommended conditions are arranged to be presented as described above, it is easy to recognize the degrees of importance of the manufacturing conditions to be examined.

Alternatively, solely the most highly recommended manufacturing condition (with which the asking price and asking delivery date will be most closely approximated at a time of condition change) may be highlighted on display.

Meanwhile, in the case where the differences are less than the minimum values of the variation values ("NO" in STEP 16), the recommended-to-be-examined element recognition section 26*e* indicates that the determined price and delivery date of the item group approximate most closely the asking price and asking delivery date respectively (STEP 19 in FIG. 3).

Figure 9:
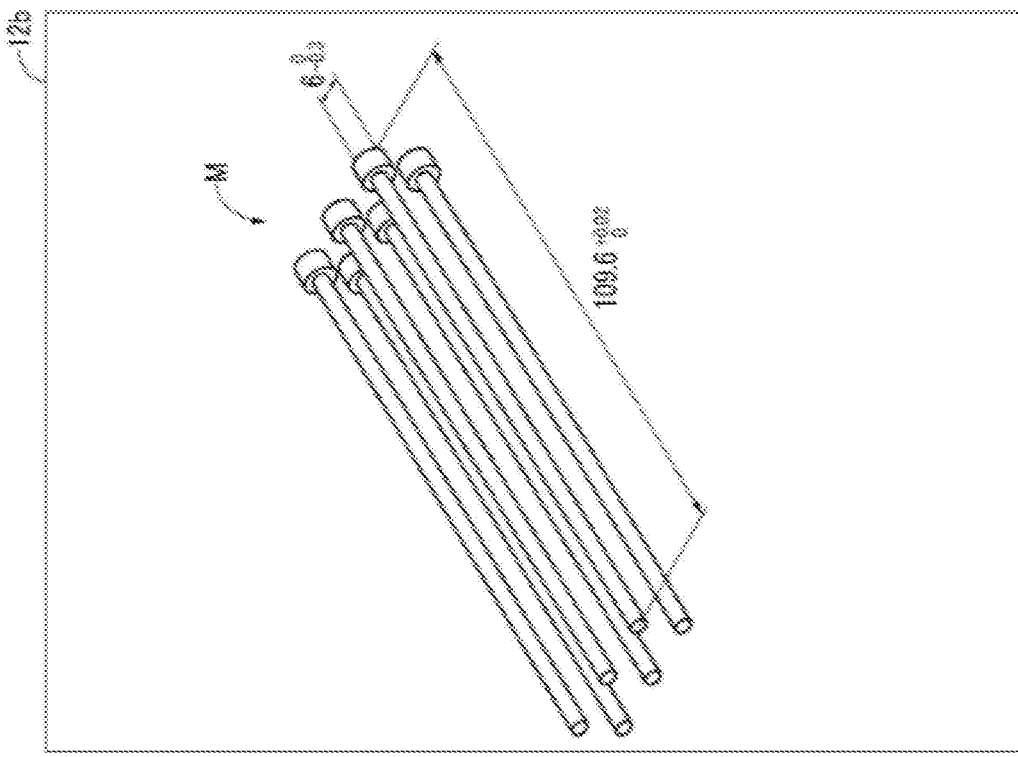
FIG. 9 is a schematic diagram showing a typical image displayed on the display screen in STEP 19 in FIG. 3.

For example, as in the image in FIG. 9, the current manufacturing condition is indicated as an optimum condition in the estimation result display area 12*g* on the display screen of the output section 12 in the information terminal 1.

Specifically, the estimation result display area 12*g* displays a message such as "This price most closely approximates the asking price."

The automatic estimation system S uses the minimum values of the differences and of the variation values as the threshold values. However, the threshold values are not limited to these values and may be set as desired by the user.

After the recommended condition is presented at the same time as the display of the variation values (after STEP 18) or following the indication that the determined price and delivery date of the item group approximate most closely the asking price and asking delivery date respectively (after STEP 19), the condition recognition section 25 discriminates whether the manufacturing condition is changed (STEP 20 in FIG. 3).

In the case where the manufacturing condition is changed ("YES" in STEP 20), the item group price/delivery date determination section 26b in the display processing section 26 determines the price and delivery date of the item group on the basis of the prices and delivery dates of the items corresponding to the changed manufacturing condition, and displays the determined price and delivery date (STEP 21 in FIG. 3).

Following STEP 21, the processing ranging from STEP 14 to STEP 20 is repeated.

In the case where the manufacturing condition is not changed ("NO" in STEP 20), the server 2 terminates the current process.

As explained above, even if the user has no specialized knowledge of design, the automatic estimation system S provides guidance of the manufacturing conditions to be examined so that the user will easily design the entire item group in a manner satisfying the desired conditions.

The embodiment pictured in the accompanying drawings was described above. However, this embodiment is not limitative of the present invention.

For example, the above-described embodiment has the design support system included in the automatic estimation system S. That is because the price and delivery date of the item group are part of the objects to be designed. Still, the design support method, server, and design support system according to the present invention may support the design of the item group as a whole. That is, the method, server, and system of the invention may also support the design of objects other than the price and delivery date (i.e., the automatic estimation system is not limitative of the invention).

For example, an embodiment of the invention may support the design of such characteristics as weight, size, and heat resistance of the entire item group. In this case, however, the manufacturing conditions need to be concerned with such characteristics as weight, size, and heat resistance.

Also, the above-described embodiment uses the asking price and asking delivery date of the item group as the criteria for discriminating whether a given manufacturing condition is recommended to be examined for changes. Alternatively, however, the design support system, server, and design support method according to the present invention may use, in addition to the asking price and asking delivery date, desired conditions (e.g., weight, size, etc., of the item group as a whole) determined beforehand by the user regarding the entire item group as the discrimination criteria. As another alternative, previously accumulated data about the conditions preferred in terms of design or about the conditions generally favored by users may be used as the criteria.

Whereas the embodiment above uses both price and delivery date as the criteria for design, either the price or the delivery date alone may be used as the criteria for design.

Also, the above embodiment highlights in color those elements in the 3D model which correspond to the manufacturing conditions recommended to be examined for changes. However, the design support method, server, and design support system of the present invention need only provide a highlighted display, not just the colored display, that allows the user to intuitively understand the elements of interest. For example, icons such as arrows may be displayed where needed to designate the elements concerned. As another example, the elements involved may be designated by voice.

Also, the above-described embodiment permits selection of the manufacturing conditions to be fixed or of the items or the elements making up the items for which the manufacturing conditions are to be fixed. Alternatively, the design support method, server, and design support system of the present invention may omit the functions to permit selection of the manufacturing conditions to be fixed or of the items or the elements making up the items for which the manufacturing conditions are to be fixed.

Further, the above embodiment displays the calculated variation values. Alternatively, the design support method, server, and design support system according to the present invention may calculate the variation values without displaying them. The calculated variations values may then be used solely to highlight on display the manufacturing conditions recommended to be examined for changes.

REFERENCE SIGNS LIST

1 Information terminal (input terminal, output terminal)
2 Server
11 Input section
12 Output section
12a Shape data input area
12b Model display area
12c Basic information display area
12d Manufacturing condition display area
12d1 Manufacturing condition selection area
12d2 Fixed checkboxes
12d3 Variation value display area
12e Asking price/delivery date input area
12f Proposed request display area
12g Estimation result display area
21 Item recognition section
22 Shape pattern storage section
23 Item information acquisition section (manufacturing condition acquisition section)
24 Item information storage section
25 Condition recognition section
25a Designated condition recognition section
25b Proposed condition recognition section
25c Asking price/delivery date recognition section
25d Fixed condition recognition section
25e Fixed element recognition section
26 Display processing section (item group display section)
26a 3D model preparation section
26b Item group price/delivery date determination section
26c Recommended condition proposition section 26d Variation value calculation section
26e Recommended-to-be-examined element recognition section
M 3D model
S Automatic estimation system (design support system)

The invention claimed is:

1. A design support method for supporting design of an item group including a plurality of items, the design support method comprising:
   an item recognizing step of recognizing each of the items included in the item group by individually recognizing elements making up the item;
   a manufacturing condition acquiring step of acquiring, for each of the recognized items, manufacturing conditions selectable at a time of manufacturing the item;
   a designated condition recognizing step of recognizing a designated condition from the manufacturing conditions;
   a recommended-to-be-examined element recognizing step of recognizing, with respect to the designated condition recognized, a first recommended-to-be-examined element corresponding to any of the manufacturing conditions that is recommended to be examined for changes and a second recommended-to-be-examined element corresponding to another of the manufacturing conditions that is recommended to be examined for changes when the first recommended-to-be-examined element is changed;
   an item group displaying step of displaying a model of the item group by differently highlighting the first recommended-to-be-examined element and the second recommended-to-be-examined element from each other, and
   the manufacturing conditions include dimensions, tolerance, material, hardness, surface treatment and parameters that affect the results of estimation of the item.

2. The design support method according to claim 1, wherein, if there are a plurality of the elements highlighted on display by the item group displaying step, the highlighted elements for which the same manufacturing condition is designated are painted in the same color.

3. A server for supporting design of an item group including a plurality of items, the server comprising:
   an item recognition section recognizing each of the items included in the item group by individually recognizing elements making up the item;
   an item information storage section storing a manufacturing condition for each of the elements selectable at a time of manufacturing the items;
   a manufacturing condition acquisition section acquiring, for each of the items recognized by the item recognition section, the manufacturing conditions selectable at a time of manufacturing the item;
   a designated condition recognition section recognizing a designated condition from the manufacturing conditions;
   a recommended-to-be-examined element recognition section recognizing, with respect to the designated condition recognized, a first recommended-to-be-examined element corresponding to any of the manufacturing conditions that is recommended to be examined for changes and a second recommended-to-be-examined element corresponding to another of the manufacturing conditions that is recommended to be examined for changes when the first recommended-to-be-examined element is changed;
   an item group display section displaying a model of the item group by differently highlighting the first recommended-to-be-examined element and the second recommended-to-be-examined element from each other and
   the manufacturing conditions include dimensions, tolerance, material, hardness, surface treatment and parameters that affect the results of estimation of the item.

4. A design support system comprising the server according to claim 3, an input terminal, and an output terminal.

5. A design support method for supporting design of an item group including a plurality of items of the same type, the design support method comprising:
   an item recognizing step of recognizing each of the items included in the item group by individually recognizing elements making up the item;
   a manufacturing condition acquiring step of acquiring, for each of the recognized items, manufacturing conditions selectable at a time of manufacturing the item;
   a designated condition recognizing step of recognizing a designated condition from the manufacturing conditions;
   a recommended-to-be-examined element recognizing step of recognizing, with respect to the designated condition recognized, the element corresponding to any of the manufacturing conditions that is recommended to be examined for changes;
   an item group displaying step of displaying a model of the item group by highlighting the element for which the manufacturing condition is recommended to be examined for changes and
   the manufacturing conditions include dimensions, tolerance, material, hardness, surface treatment and parameters that affect the results of estimation of the item.

* * * * *